United States Patent [19]

Yamamoto et al.

[11] Patent Number: 5,363,294
[45] Date of Patent: Nov. 8, 1994

[54] SURFACE LIGHT SOURCE DEVICE

[75] Inventors: Kunitoshi Yamamoto; Hiroshi Fukushima, both of Kyoto, Japan

[73] Assignee: Nissha Printing Co., Ltd., Kyoto, Japan

[21] Appl. No.: 858,949

[22] Filed: Mar. 27, 1992

[30] Foreign Application Priority Data

| Mar. 29, 1991 [JP] | Japan | 3-93772 |
| Jun. 17, 1991 [JP] | Japan | 3-173070 |
| Jun. 18, 1991 [JP] | Japan | 3-174324 |

[51] Int. Cl.$^5$ ............................................. F21V 7/04
[52] U.S. Cl. ........................................ 362/330; 362/26; 362/31
[58] Field of Search ............... 362/26, 31, 223, 308, 362/311, 327, 328, 330, 307, 290

[56] References Cited

U.S. PATENT DOCUMENTS

| 2,347,665 | 5/1944 | Christensen et al. | 362/31 |
| 3,752,974 | 8/1973 | Baker et al. | 362/31 |
| 4,779,166 | 10/1988 | Tanaka et al. | 362/31 |
| 4,860,171 | 8/1989 | Kojima | 362/327 |
| 4,937,709 | 6/1990 | Yanaki et al. | 362/31 |
| 4,985,809 | 1/1991 | Matsui et al. | |
| 4,989,933 | 2/1991 | Duguay | 362/31 |
| 5,036,435 | 7/1991 | Tokuda et al. | 362/31 |
| 5,134,549 | 7/1992 | Yokoyama | 362/31 |

FOREIGN PATENT DOCUMENTS

| 0442529A3 | 8/1991 | European Pat. Off. . |
| 8914233 | 2/1990 | Germany . |
| 241590 | 9/1989 | Japan . |
| 244490 | 9/1989 | Japan | 362/253 |
| 245220 | 9/1989 | Japan . |
| 2-269382 | 11/1990 | Japan . |

*Primary Examiner*—Ira S. Lazarus
*Assistant Examiner*—Y. Quach
*Attorney, Agent, or Firm*—Wenderoth, Lind & Ponack

[57] ABSTRACT

A surface light source device includes a light guiding plate which is transparent, a line light source provided on one end edge of the light guiding plate, an end edge reflection layer provided on the other end edge of the light guiding plate, and a light diffusion/transmission section provided on a back face of the light guiding plate. A ratio of an area of the light diffusion/transmission section to a whole area of the back face of the light guiding plate gradually increases with an increase in distance from the light source end edge in a region from the end edge on the light source end of the light guiding plate to a position at which a surface emission luminance of the light guiding plate is lowest, and is constant in a region from the position to the other end edge on the end edge reflection layer end of the light guiding plate. A back face reflection layer which is white is provided on the back face of the light guiding plate.

17 Claims, 4 Drawing Sheets

SURFACE LIGHT SOURCE DEVICE

BACKGROUND OF THE INVENTION

The present invention relates to a thin surface light source device comprising a line light source provided on one end edge of a transparent light guiding plate, an end edge reflection layer formed on the other end edge of the light guiding plate, a light diffusion/transmission section and a white back face reflection layer each formed on the back face of the light guiding plate.

The surface light source devices of the present invention are uniform in quality and are suitably used as backlights for liquid crystal display devices.

Conventionally, thin surface light source devices have either one line light source provided on one end of a light guiding plate or two line light sources provided on opposing ends of the light guiding plate.

The line light source device having one line light source consumes a smaller quantity of power and is lighter than the one having two line light sources, but the former has a disadvantage that the surface emission luminance of the light guiding plate is nonuniform depending on the distance from the line light source. That is, the surface emission luminance of the light guiding plate gradually decreases with an increase in distance from the line light source.

Proposals have been made to overcome the above-described disadvantage. For example, a light diffusion/transmission section has been formed on the back face of the light guiding plate so that the light diffusion/transmission section diffuses light guided to the light guiding plate. A surface light source device according to U.S. Pat. No. 4,985,809 is superior in this respect. A description of this device is set forth below.

The device comprises a line light source provided on one end edge of a transparent light guiding plate, a white side face reflection layer provided on the other end edge of the light guiding plate, and a light diffusion/transmission section and a white back face reflection layer each formed on the back face of the light guiding plate, as shown in FIG. 6. The light diffusion/transmission section is composed of a plurality of fine dot patterns printed on the back face of the light guiding plate. Referring to FIG. 7, the ratio of the area of dot patterns of the light diffusion/transmission section to the whole area of the back face of the light guiding plate (i.e. the light diffusion/transmission section density) gradually becomes greater with an increase in distance from the line light source, in a region from an end edge (a') on the line light source edge of the light guiding plate to a position (b') at which the surface emission luminance of the light guiding plate is lowest, while the ratio of the area of dot patterns of the light diffusion/transmission section to the whole area of the back face of the light guiding plate (i.e. the diffusion/transmission section density) becomes gradually smaller in the region from the position (b') to the end edge (c') on the end edge reflection layer side of the light guiding plate.

That is, the device was invented based on a phenomenon that the surface emission luminance of the light guiding plate gradually decreases with an increase in distance from the end edge on the line light source side while it increases from the position at which the surface emission luminance of the light guiding plate is lowest toward the end edge on the end edge reflection layer side of the light guiding plate under the influence of light reflected by the end edge reflection layer. Accordingly, as shown in FIG. 7, an ideal surface light source device, which provides a uniform surface emission luminance through the light guiding plate as shown by a curve (Z') expressing a resultant surface emission luminance of the light guiding plate, can be manufactured wherein the change in the surface emission luminance of the light guiding plate as expressed by curve (X') is made inversely proportional to a curve (Y') expressing the change in the ratio of dot patterns of the light diffusion/transmission section to the whole area of the back face of the light guiding plate (i.e. expressing the light diffusion/transmission section density).

However, it is very difficult to mass-produce the above-described surface light source device because it is impossible to produce a plurality of line light sources having an equal luminance and a plurality of light guiding plates having an equal light diffusion degree even though each device is strictly quality-controlled. Since the line light source comprises a plurality of parts or substances such as a glass tube, electrodes, a fluorescent substance, mercury, and inactive gas, the luminances of line light sources are different from piece to piece because the qualities of the parts are varied from part to part, and further, it is difficult to assemble a plurality of parts of the same quality. In addition, it is impossible to uniformly print dot patterns on the back face of the light guiding plate with the same quality. The following discrepancies occur from piece to piece in the positions of dots on the light diffusion/transmission section, the sizes of dots, the thicknesses of ink films of dots, the thickness of light guiding plates, the sizes thereof, and the sizes of cut faces thereof. Thus, it is unavoidable that the light diffusion degrees of the light guiding plates will be different from one another.

Therefore, in mass-produced surface light source devices according to U.S. Pat. No. 4,985,809, the following disadvantages occur: Let it be supposed that a curve (Y') expressing the change in the ratio of the area of dot patterns of the light diffusion/transmission section to the whole area is obtained when a position (B') at which the ratio of the area of dot patterns of the light diffusion/transmission section to the whole area of the back face of the light guiding plate is maximum is located at the position (b') where the surface emission luminance of the light guiding plate is lowest; a curve Y'(1) expressing the change in the ratio of the area of dot patterns of the light diffusion/transmission section to the whole area of the back face of the light guiding plate is obtained when the position (B') is located at b'(1) situated between the end edge (a') and the position (b'); and a curve Y'(2) expressing the change in the ratio of the area of dot patterns of the light diffusion/transmission section to the whole area of the back face of the light guiding plate is obtained when the position (B') is located at a position b'(2) situated between the position (b') and the end edge (c'). A curve Z'(1) expressing the surface emission luminance of the light guiding plate and corresponding to the curve Y'(1) is greater than a curve (Z') in parallel therewith in the region from the end edge (a') to the position b'(1), decreases greatly and becomes smaller than that in the region from the position b'(1) to the position (b'), and becomes smaller than that in parallel therewith in the region from the position (b') to the end edge (c'). The curve (Z') expressing the surface emission luminance of the light guiding plate corresponds to the curve (Y'). A curve Z'(2) expressing the surface emission luminance of the light guiding plate and corresponding to the curve Y'(2) is smaller than the curve (Z') in parallel therewith in the region from the end edge (a') to the position (b'), increases greatly and becomes greater than that in the region from the position (b') to the position b'(2), and is greater than that in parallel therewith in the region from the position b'(2) to the end edge (c'). Therefore, the gap between a high luminance point H'(1) and a low luminance point L'(1) of the curve Z'(1) becomes greater with the approach of the position (B') from the position (b') toward the position b'(1). Similarly, the gap between a high luminance point H'(2) and a low luminance point L'(2) of the curve Z'(2) becomes greater with the approach of the position (B') from the position (b') toward the position b'(2). Thus, the qualities of devices according to U.S. Pat. No. 4,985,809 vary from piece to piece. The qualities of the devices can be made to be equal to each other by narrowing the permissible range of the position (B') indeed, but it is necessary to strictly control the quality of the line light source and the light guiding plate.

SUMMARY OF THE INVENTION

It is an object of the present invention to provide a surface light source device capable of reducing the reflection operation of an end edge reflection layer.

In accomplishing these and other objects, according to one aspect of the present invention, there is provided a surface light source device comprising:

a light guiding plate which is transparent;

a line light source provided on one end edge of the light guiding plate;

an end edge reflection layer provided on the other end edge of the light guiding plate;

a light diffusion/transmission section provided on a back face of the light guiding plate, a ratio of an area of the light diffusion/transmission section to a whole area of the back face of the light guiding plate gradually increasing with an increase in distance in a region from an end edge on a light source end of the light guiding plate to a position at which a surface emission luminance of the light guiding plate is lowest, and being constant in a region from the position to an end edge on an end edge reflection layer end of the light guiding plate; and a back face reflection layer which is white and is provided on the back face of the light guiding plate.

In this construction, the ratio of dot area to the area of the light diffusion/transmission section (i.e. the light diffusion/transmission section density) gradually increases with an increase in distance from the light source in a region from an end edge on the light source end of the light guiding plate to a position at which the surface emission luminance of the light guiding plate is lowest and is constant in a region from the position to an end edge on an end edge reflection layer end of the light guiding plate.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
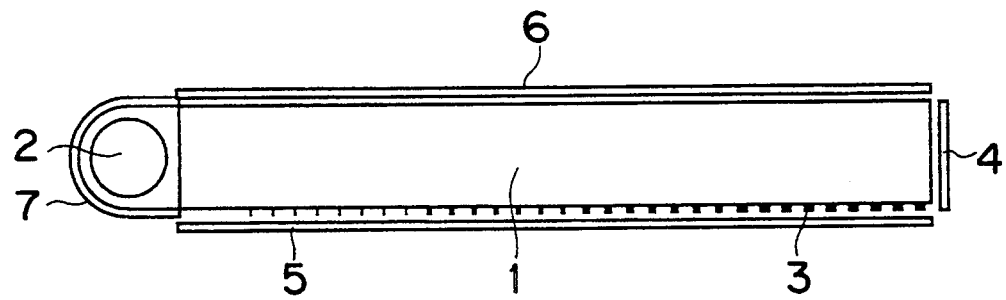
FIG. 1 is a sectional view showing a surface light source device according to a first embodiment of the present invention.

Before the description of the present invention proceeds, it is to be noted that like parts are designated by like reference numerals throughout the accompanying drawings.

Embodiments of the present invention are described below with reference to FIGS. 1 through 5. A surface light source device comprises a light guiding plate 1; a line light source 2 positioned on one end edge of the light guiding plate 1, namely, on an end edge (a) (refer to FIGS. 4 and 5) at the line light source end of the light guiding plate 1; an end edge reflection layer 4 provided on the other end edge (c) (refer to FIGS. 1 and 4) of the light guiding plate 1, a light diffusion/transmission section 3 provided on the back face of the light guiding plate 1, and a white back face reflection layer 5 provided on the back face of the light guiding plate 1. This construction allows light emitted by the line light source 2 to be effectively utilized to provide a high luminance as described below.

The line light source 2 is composed of a cathode ray tube, for example, a hot cathode ray tube or a cold cathode ray tube. Preferably, a curved reflection plate 7 is provided to enclose the line light source 2 so as to utilize light emitted by the line light source 2 effectively.

The thickness, material, and configuration of the light guiding plate 1 are selected depending on its use. For example, in order to use the light guiding plate 1 as a backlight of a liquid crystal display device, its thickness is preferably in the range of from 1 mm to 8 mm; its material is preferably selected from acrylic resin, polycarbonate resin, polyvinyl chloride, or glass; and its configuration is preferably rectangular or square.

Figure 2:
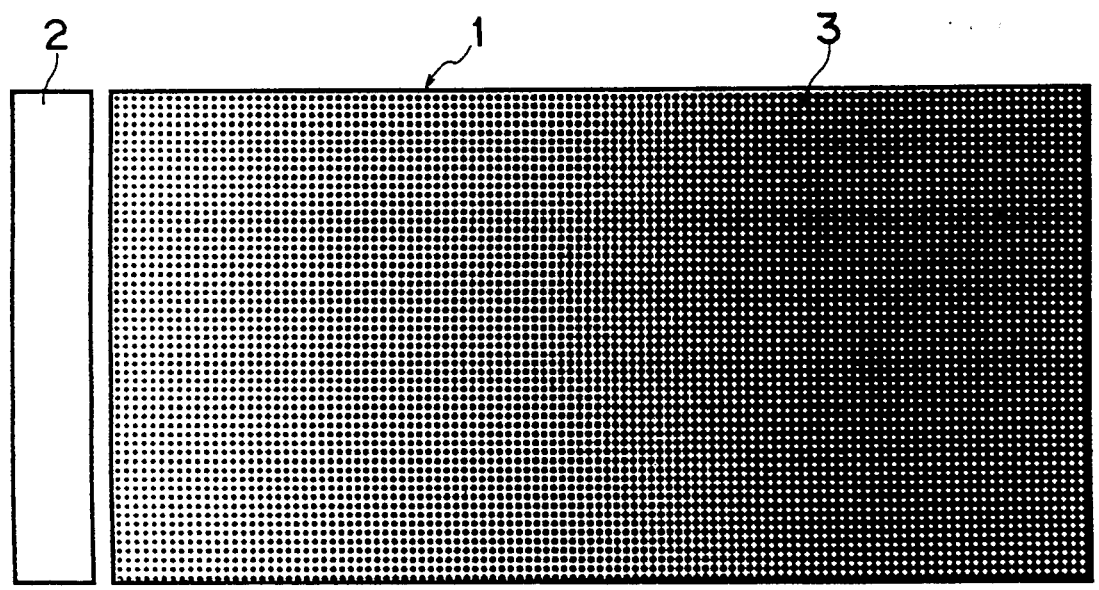
FIG. 2 is an enlarged bottom view showing a surface light source device according to the embodiment shown in FIG. 1.
Figure 3:
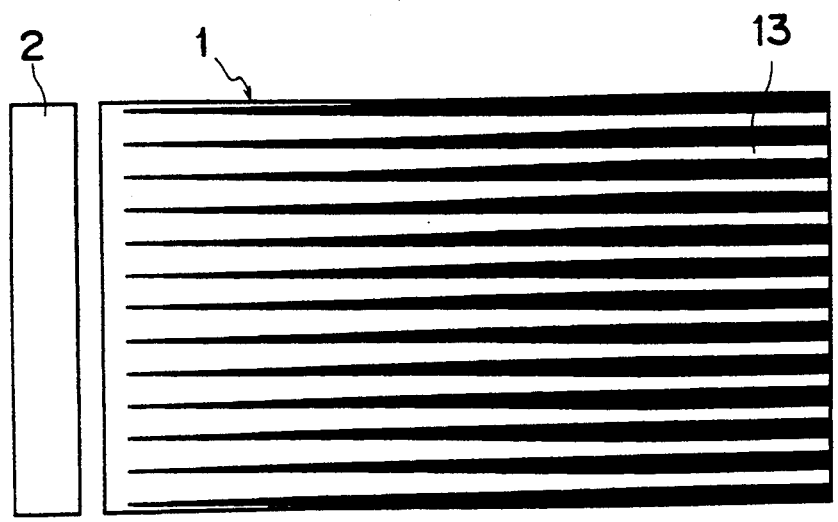
FIG. 3 is an enlarged bottom view showing a surface light source device according to a second embodiment of the present invention.
Figure 4:
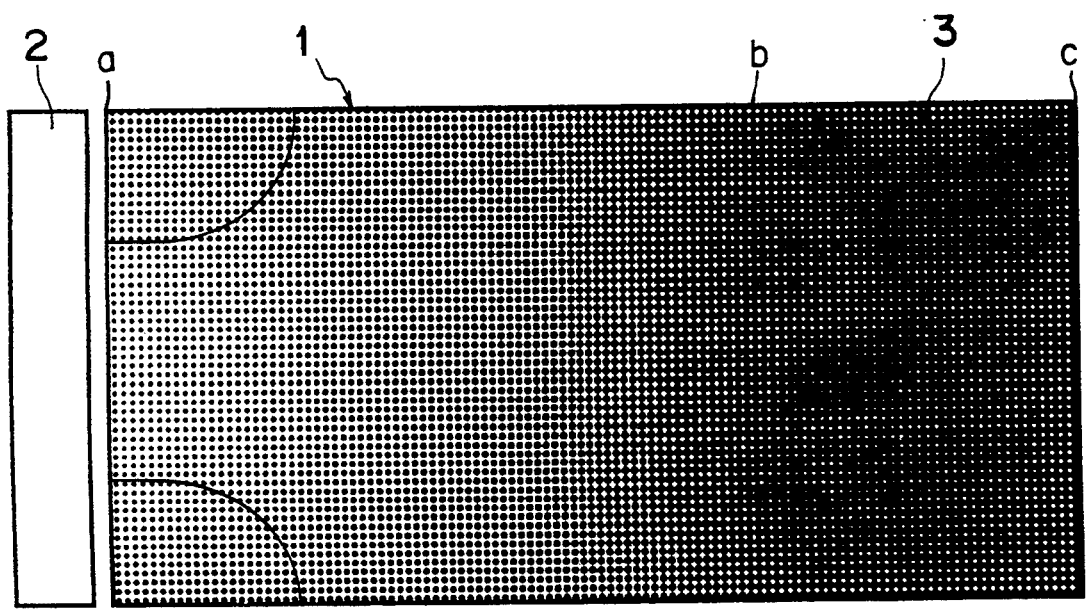
FIG. 4 is a bottom view showing a surface light source device according to a third embodiment of the present invention.

The light diffusion/transmission section 3 is formed by means of gravure printing, offset printing, screen printing or transfer. In a region from the end edge (a) on the light source end of the light guiding plate 1 to a position (b) at which the surface emission luminance of the light guiding plate 1 is lowest, the ratio of dot area of the light diffusion/transmission section 3 to the whole area of the back face of the light guiding plate 1 (i.e. the diffusion/transmission section density) gradually increases with an increase in distance from the light source end of the plate 1 along a first direction (which, in the illustrated embodiments, is perpendicular to the end edges of the plate 1 and parallel to side edges of the plate). In a region from the position (b) to the end edge (c) on the side edge reflection layer side of the light guiding plate 1, the ratio is constant along the first direction. The change in ratio of the dot area of the light diffusion/transmission section 3 to the whole area of the back face of the light guiding plate 1 (i.e. the change in the diffusion/transmission section density) can be accomplished by the provision of dots which gradationally change as shown in FIGS. 1 and 2, or the provision of stripes 13 which gradationally change as shown in FIG. 3. The change in ratio of the dot area of the light diffusion/transmission section 3 to the area of the back face of the light guiding plate 1 is indicated in the form of a curve (Y) in FIG. 5. The dots can have arbitrary shapes such as round, square, or chain dot-shapes. The line light source 2 is bright in the center portion thereof and dark at both end portions thereof. Therefore, the surface of the light guiding plate 1 can be made more uniformly luminous in the following manner. The ratio of the dot area of the light diffusion/transmission section 3 to the whole area of the back face of the light guiding plate 1 is made constant along a second direction perpendicular to the first direction for most of the surface of the light guiding plate 1. However, in regions defined at the two corners of the guiding plate 1 adjacent the ends of the line light source 2 (i.e. the corners defined at the junctions between the light source end edge and the two side edges of the guiding plate), the ratio is made to increase quadratically toward each of the respective side edges along the second direction, as shown in FIG. 4. These two corner regions are bordered, not only by the end edge and respective side edges of the plate, but also by arc-shaped borders. Each of the arc-shaped borders extends from a predetermined location at the light source end edge of the plate 1 to a location of a respective one of the side edges of the plate 1 (the predetermined locations are defined between the respective side edges and a point centrally between the two side edges, at positions where the surface emission luminance of the light guiding plate 1 in the second direction (i.e. the direction parallel with the axial direction of the line light source 2) is lowest. The centers of curvature of the arc-shaped borders are at the corners defined by the junctions between the light source end edge and the side edges of the guide plate 1.

Preferably, the light diffusion/transmission section 3 is composed of ink containing a granular transparent substance such as calcium carbonate or silica having a refractive index almost equal to or smaller than that of the light guiding plate 1. Thus, the light diffusion of the light diffusion/transmission section 3 can be improved. A position at which the ratio of the dot area of the light diffusion/transmission section 3 to the area of the back face of the light guiding plate 1 is maximum does not mean that the ratio is 100%.

The end edge reflection layer 4 is formed with a white film or a metal plate adhered to the end edge (c) or with white ink applied thereto or a metal evaporated thereon. The end edge reflection layer 4 can be formed on an end edge other the end edge (c).

Since the back face reflection layer 5 is composed of a white film or a white plate overlapped on the back face of the light guiding plate 1, slight gaps are formed between the light guiding plate 1 and the back face reflection layer 5 in regions in which the light diffusion/transmission section 3 is not formed. Therefore, light emitted by the line light source 2 is almost totally reflected in the interior of the light guiding plate 1. That is, a high percentage of the light emitted from the light source can be guided to the light guiding plate 1.

The end edge reflection layer 4 or the back face reflection layer 5 can be composed of a casing, for use in the surface light source device, having white paint applied to the inner surface thereof.

In addition to the above-described essential components of the surface light source device, a light diffusion layer 6 can be provided as necessary on the surface of the light guiding plate 1 where no light diffusion/transmission section is formed. In this case, preferably, the light diffusion layer 6 does not contact the light guiding plate 1 but is rather spaced therefrom so as to allow a high percentage of the light to be guided to the light guiding plate 1. The light diffusion layer 6 can be formed by a resin film coated with a light diffusion substance, or by a light-diffusive resin film or a light-diffusive resin plate, each of which has a light-diffusing function.

According to the above construction, the ratio of dot area of the light diffusion/transmission section 3 to the whole area of the back face of the light guiding plate 1 (i.e. the light diffusion/transmission section density) is smallest in the vicinity of the end edge (a) on the line light source end of the light guiding plate 1. Therefore, the greater part of the light emitted by the line light source 2 is sequentially guided to the interior of the light guiding plate 1 while the light is being totally reflected repeatedly, i.e., the incident angle and the reflection angle thereof are equal to each other. A part of the light emitted by the line light source 2 is scattered on the light diffusion/transmission section 3 and directly guided to the surface of the light guiding plate 1 or reaches the back face reflection layer 5 through the light diffusion/transmission section 3. Then, this part of the light enters the light diffusion/transmission section 3 again after it has been reflected by the back face reflection layer 5, and thereafter, is indirectly guided to the surface of the light guiding plate 1. A part of the light which has been scattered in the light diffusion/transmission section 3 is totally reflected inside the light guiding plate 1.

The ratio of the dot area of the light diffusion/transmission section 3 to the whole area of the back face of the light guiding plate 1 gradually increases with an increase in the distance from the end edge (a) and with a decrease in the distance from the position (b) at which the surface emission luminance of the light guiding plate 1 is lowest. Therefore, the quantity of light which is totally reflected in the interior of the light guiding plate 1 gradually decreases and the quantity of light which is scattered on the light diffusion/transmission section 3 and directly or indirectly guided to the surface of the light guiding plate 1 gradually increases.

The ratio of the dot area of the light diffusion/transmission section 3 to the whole area of the back face of the light guiding plate 1 is greatest in the position (b), and such ratio does not change (i.e. is constant) in the region from the position (b) to the end edge (c) on the end edge reflection layer end of the plate 1. Therefore, in the region from the position (b) to the end edge (c), light emitted by the line light source 2 is mostly scattered on the light diffusion/transmission section 3 and then, guiding to the surface of the light guiding plate 1 directly or indirectly. A part of the light emitted by the line light source 2 is sequentially guided to the interior of the light guiding plate 1 while being repeatedly and totally reflected therein. Because the ratio of the dot area of the light diffusion/transmission section 3 to the whole area of the back face of the light guiding plate 1 does not change (i.e. is constant) in the region from the position (b) to the end edge (c), the quantity of light reflected by the light diffusion/transmission section 3 is greater than that provided by the device according to U.S. Pat. No. 4,985,809 in which the ratio of dot area of the light diffusion/transmission section 3 to the whole area of the back face of the light guiding plate 1 gradually decreases, and consequently, the quantity of light which reaches the end edge reflection layer 4 of the present invention is smaller than that supplied by the device according to U.S. Pat. No. 4,985,809. That is, the quantity of light reflected by the end edge reflection layer 4 is smaller. Therefore, according to the device of the present invention, the reflection operation of the end edge reflection layer 4 can be less than that of the device disclosed in U.S. Pat. No. 4,985,809.

A cold cathode ray tube having a length of 145 mm, a diameter of 4 mm, and a luminance of 12000 nt (manufactured by Matsushita Electric Co., Ltd.) was prepared as the line light source 2. The light guiding plate 1 was made of a transparent acrylic resin plate having a length of 220 mm, a width of 150 mm, and a thickness of 2 mm.

The change of the surface emission luminance of the line light source 2 was examined to find a curve (X) indicating the change in the surface emission luminance of the line light source 2. Based on the curve (X), a plurality of dots was printed on the back face of the light guiding plate 1 by screen printing to form the light diffusion/transmission section 3. The dots comprised mat ink containing pigment consisting of a mixture of calcium carbonate and silica, methyl methacrylate resin, and a solvent of ketone group.

The ratio of the dot area of the light diffusion/transmission section 3 to the whole area of the back face of the light guiding plate 1 (i.e. the light diffusion/transmission density) gradually increases inversely proportional to the curve expressing the change in the surface emission luminance of the light guiding plate 1 in the region from the end edge (a) to the portion (b) at which the surface emission luminance is lowest and is constant in the region from the portion (b) to the end edge (c).

A white film (manufactured by Toray Co., Ltd.) was adhered to the end edge (c).

The surface light source device comprised the back face reflection layer 5 made of a white polyethylene terephthalate resin plate provided on a case for use in the surface light source device, the light guiding plate 1 provided on the back face reflection layer 5, the light diffusion layer 6 consisting of milky-white polyethylene terephthalate resin plate provided on the light guiding plate 1, the line light source 2 provided at the end edge (a), and the curved reflection plate 7 which enclosed the line light source 2.

The device approximately uniformly had a high surface emission luminance (350 nt) through the luminous surface.

As described above, in the embodiments, the ratio of the dot area of the light diffusion/transmission section 3 to the whole area of the back face of the light guiding plate 1 gradually increases with an increase in distance from the light source end edge, in the region from the end edge (a) to a position (b) at which the surface emission luminance of the light guiding plate 1 is lowest, and is constant in the region from the position (b) to the end edge (c). Thus, the following advantage can be obtained.

In mass-producing the surface light source device of the present invention, surface light source devices have approximately uniform quality even when the position (B) of the light diffusion/transmission section 3 having the greatest ratio of the dot area of the light diffusion/transmission section 3 to the whole area of the back face of the light guiding plate 1 is situated at a position b(1) between the end edge (a) and the position (b) or at a position b(2) between the position (b) and the end edge (c).

Figure 5:
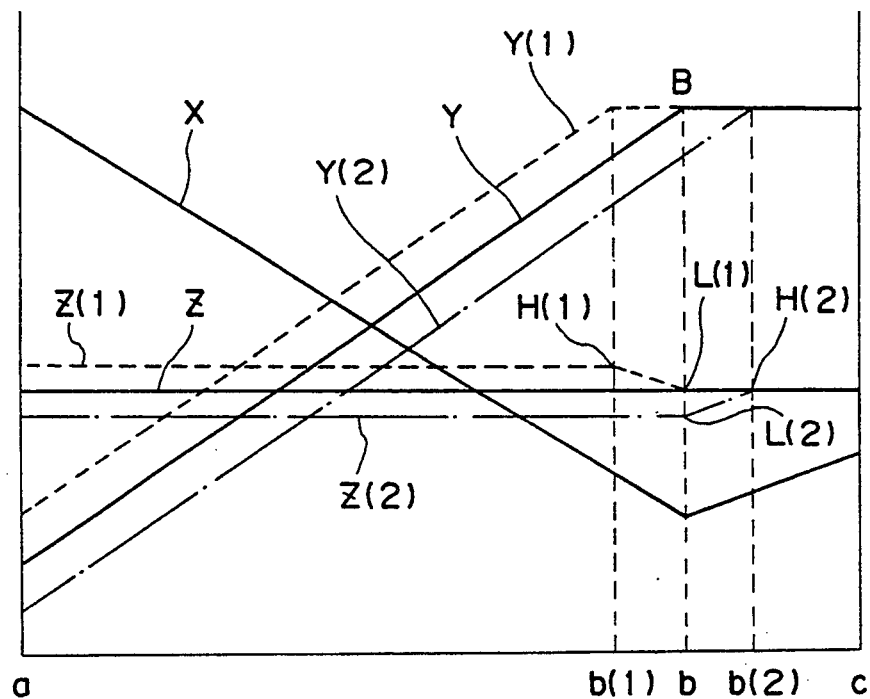
FIG. 5 is a graph showing the relationship among a curve (X) expressing the change of surface emission luminance, a curve (Y) representing the ratio of dot area of a light diffusion/transmission section to the area of the back face of the light guiding plate (i.e. representing the light diffusion/transmission density), and a curve (Z) expressing surface emission luminance.

A curve (Y) of FIG. 5 expressing the change in the ratio of the dot area of the light diffusion/transmission section 3 to the whole area of the back face of the light guiding plate 1 is obtained when the position (B) of the light diffusion/transmission section 3 is located at the position (b). A curve Y(1) of FIG. 5 expressing the change in the ratio of the dot area of the light diffusion/transmission section 3 to the whole area of the back face of the light guiding plate 1 is obtained when the position (B) of the light diffusion/transmission section 3 is located at the position b(1). A curve Y(2) of FIG. 5 expressing the change in the ratio of the dot area of the light diffusion/transmission section 3 to the whole area of the back face of the light guiding plate 1 is obtained when the position (B) of the light diffusion/transmission 3 is situated at the position b(2).

Figure 7:
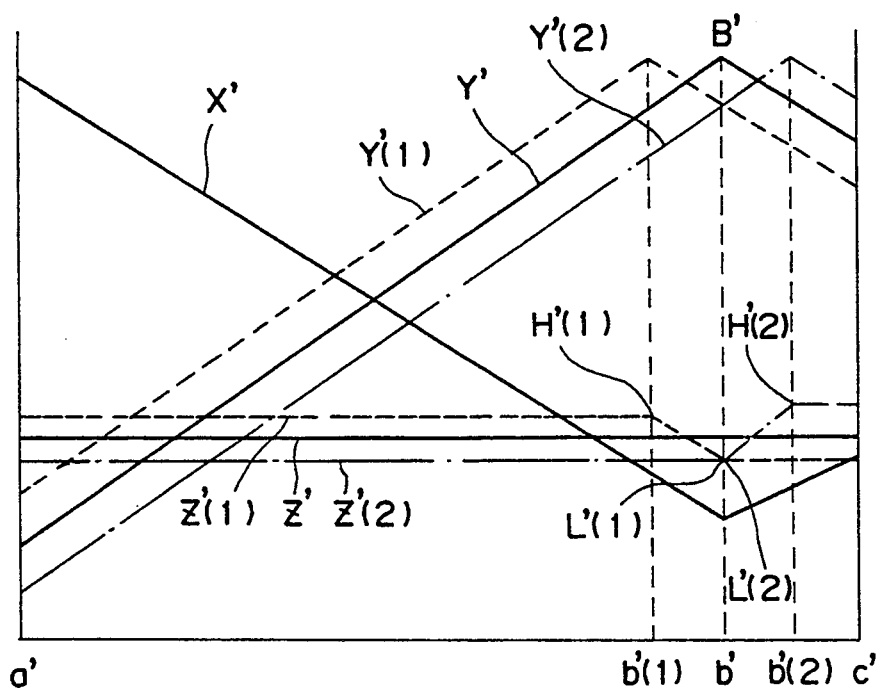
FIG. 7 is a graph showing the relationship among a curve (X') expressing the change of surface emission luminance, a curve (Y') representing the ratio of dot area of a light diffusion/transmission section to the area of the back face of a light guiding plate, and a curve (Z') expressing surface emission luminance, for a conventional surface light source device in which the change of the surface emission luminance of the light guiding plate is inversely proportional to the change of the ratio of dot area of a light diffusion/transmission section to the area of the back face of the light guiding plate.
Figure 6:
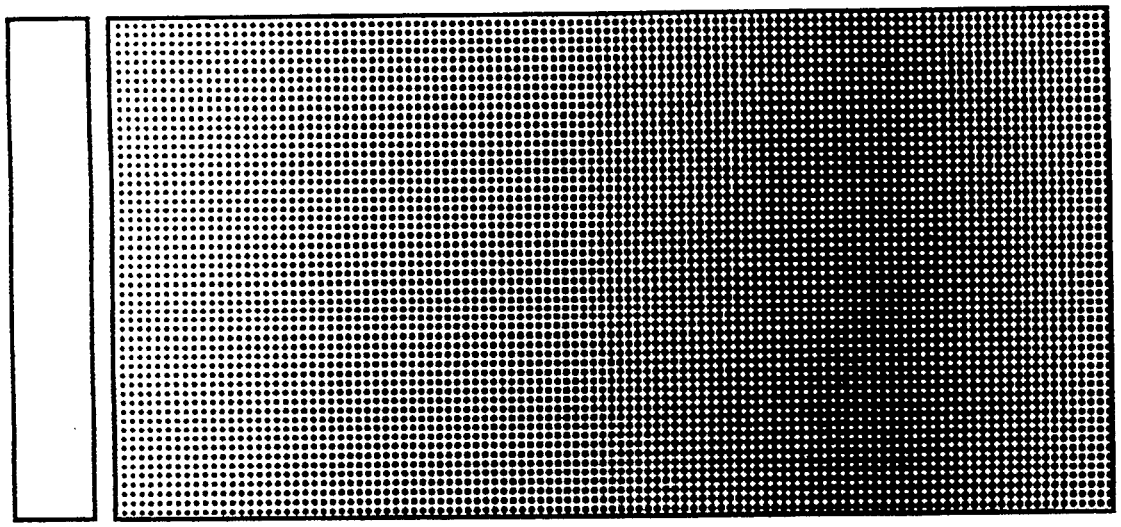
FIG. 6 is an enlarged bottom view showing a conventional surface light source device.

A curve Z(1) expressing the surface emission luminance of the light guiding plate 1 corresponds to the case where the position (B) of the light diffusion/transmission section 3 is located at the position b(1). A curve Z expressing the surface emission luminance of the light guiding plate 1 corresponds to the case where the position (B) of the light diffusion/transmission section 3 is located at the position (b). A curve Z(2) expressing the surface emission luminance of the light guiding plate 1 corresponds to the case where the position (B) of the light diffusion/transmission section 3 is located at the position b(2). The curve Z(1) is greater than the curve (Z) in parallel therewith in the region from the end edge (a) to the position b(1), approaches the curve (Z) in the region from the position b(1) to the position (b), and becomes equal to the curve (Z) in the region from the position (b) to the end edge (c). Therefore, the gap between a high luminance point H(1) and a low luminance point L(1) of the curve Z(1) is small. Thus, the gap between the high luminance point H(1) and the low luminance point L(1) is half as small as the gap between the high luminance point H'(1) and the low luminance point L'(1) of a curve Z'(1) of FIG. 6 according to the device disclosed in U.S. Pat. No. 4,985,809. The curve Z(2) in FIG. 5 is smaller than the curve (Z) in parallel therewith in FIG. 5 in the region from the end edge (a) to the position (b), slightly approaches the curve (Z) in the region from the position (b) to the position b(2), and becomes equal to the curve (Z) in the region from the position b(2) to the end edge (c). Therefore, the gap between a high luminance point H(2) and a low luminance point L(2) of the curve Z(2) is small. Thus, the gap between the high luminance point H(2) and the low luminance point L(2) of the curve Z(2) is half as small as the gap between the high luminance point H'(2) and the low luminance point L'(2) of a curve Z'(2) of FIG. 7 according to the device disclosed in U.S. Pat. No. 4,985,809.

As described above, if the surface light source devices according to the present invention and according to U.S. Pat. No. 4,985,809 are quality-controlled to the same degree in mass-production, those of the present invention are twice as reliable as the device according to U.S. Pat. No. 4,985,809. In other words, if the quality control of the line light source, the light guiding plate, and other components of the present invention is half as strict as the quality control of the device according to U.S. Pat. No. 4,985,809, the quality of the former can be the same as the latter because the permissible range of the dislocation of the position (B) of the devices of the former is greater.

Alternatively, according to the present invention, the ratio of the dot area of the light diffusion/transmission section 3 to the whole area of the back face of the light guiding plate 1 can gradually increase in a manner other than inversely proportionally to the light luminance, in the region from a position at which the surface emission luminance of the light guiding plate 1 is lowest to the end edge of the light guiding plate 1 opposed to the line light source 2. Therefore, the above construction can compensate for a lack of reflection of the end edge reflection layer 4 even though it is insufficient for the reflection of the end edge reflection layer 4 or there is no end edge reflection layer 4, and thus the surface of the light guiding plate 1 can be made more uniformly luminous.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A surface light source device comprising:
   a transparent light guiding plate having a first end edge, a second end edge opposite said first end edge, a first side edge, a second side edge opposite said first side edge, a front face and a back face;
   a line light source mounted along said first end edge of said light guiding plate;
   an end edge reflection layer mounted along said second end edge of said light guiding plate;
   a back face reflection layer which is white and is provided on said back face of said light guiding plate;
   a light diffusion/transmission section provided on said back face of said light guiding plate;
   wherein, in a first region from said first end edge to a first predetermined position between said first and second end edges, a density of said light diffusion/transmission section increases gradually along a first direction perpendicular to said first end edge with an increase in distance from said first end edge; and
   wherein, in a second region from said first predetermined position to said second end edge, a density of said light diffusion/transmission section is constant along said first direction.

2. A surface light source device as recited in claim 1, wherein
   said first predetermined position substantially corresponds to a position at which a surface emission luminance of said light guiding plate is lowest when said light diffusion/transmission section is absent.

3. A surface light source device as recited in claim 1, wherein
   in a third region extending in a second direction parallel with said first end edge from a second predetermined position to a third predetermined position, a density of said light diffusion/transmission section is constant along said second direction;
   said second predetermined position is located along said second direction centrally between said first and second side edges of said light guiding plate, and said third predetermined position is located along said second direction between said second predetermined position and said first side edge of said light guiding plate; and
   in a fourth region extending in said second direction from said third predetermined position to said first side edge of said light guiding plate, a density of said light diffusion/transmission section increases quadratically along said second direction.

4. A surface light source device as recited in claim 3, further comprising
   a light diffusion layer provided on said front face of said light guiding plate.

5. A surface light source device as recited in claim 3, wherein
   said light diffusion/transmission section comprises a granular transparent substance having a refractive index substantially equal to or less than that of said light guiding plate.

6. A surface light source device as recited in claim 3, wherein
   said light diffusion/transmission section comprises dots.

7. A surface light source device as recited in claim 1, wherein
   in a third region extending, in a second direction parallel with said first end edge, from a second predetermined position to a third predetermined position, a density of said light diffusion/transmission section is constant along said second direction, said second direction extending from said second predetermined position toward said third predetermined position;
   said second predetermined position is located along said second direction between said second side edge and a center point located centrally between said first and second side edges, and said third predetermined position is located along said second direction between said first side edge and said center point; and
   in a fourth region extending in said second direction from said third predetermined position to said first side edge of said light guiding plate, a density of said light diffusion/transmission section increases quadratically along said second direction.

8. A surface light source device as recited in claim 7, wherein
   in a fifth region extending, in a third direction opposite said second direction, from said second predetermined position to said second side edge of said light guiding plate, a density of said light diffusion/transmission section increases quadratically along said third direction.

9. A surface light source device as recited in claim 8, further comprising
   a light diffusion layer provided on said front face of said light guiding plate.

10. A surface light source device as recited in claim 8, wherein
    said light diffusion/transmission section comprises a granular transparent substance having a refractive index substantially equal to or less than that of said light guiding plate.

11. A surface light source device as recited in claim 8, wherein
    said light diffusion/transmission section comprises dots.

12. A surface light source device as recited in claim 1, further comprising
    a light diffusion layer provided on said front face of said light guiding plate.

13. A surface light source device as recited in claim 12, wherein
    said light diffusion/transmission section comprises a granular transparent substance having a refractive index substantially equal to or less than that of said light guiding plate.

14. A surface light source device as recited in claim 12, wherein
    said light diffusion/transmission section comprises dots.

15. A surface light source device as recited in claim 1, wherein
    said light diffusion/transmission section comprises a granular transparent substance having a refractive index substantially equal to or less than that of said light guiding plate.

16. A surface light source device as recited in claim 15, wherein
    said light diffusion/transmission section comprises dots.

17. A surface light source device as recited in claim 1, wherein
    said light diffusion/transmission section comprises dots.

* * * * *